US011657061B2

(12) United States Patent
Vashist et al.

(10) Patent No.: US 11,657,061 B2
(45) Date of Patent: May 23, 2023

(54) APPLICATION PROGRAMMING INTERFACE USING DIGITAL TEMPLATES TO EXTRACT INFORMATION FROM MULTIPLE DATA SOURCES

(71) Applicant: Otsuka America Pharmaceutical, Inc., Rockville, MD (US)

(72) Inventors: Akshay Vashist, Princeton Junction, NJ (US); Nipa Parikh, Somerset, NJ (US); Jennifer Cichone, Asbury, NJ (US); Krystle Pianka, Ringoes, NJ (US)

(73) Assignee: OTSUKA AMERICA PHARMACEUTICAL, INC., Rockville, MD (US)

( * ) Notice: Subject to any disclaimer, the term of this patent is extended or adjusted under 35 U.S.C. 154(b) by 0 days.

(21) Appl. No.: 16/450,056

(22) Filed: Jun. 24, 2019

(65) Prior Publication Data

US 2019/0391985 A1 Dec. 26, 2019

Related U.S. Application Data

(60) Provisional application No. 62/689,050, filed on Jun. 22, 2018.

(51) Int. Cl.
*G06F 3/048* (2013.01)
*G06F 16/25* (2019.01)
(Continued)

(52) U.S. Cl.
CPC .......... *G06F 16/254* (2019.01); *G06F 3/0481* (2013.01); *G06F 16/2379* (2019.01); *G06F 40/40* (2020.01)

(58) Field of Classification Search
None
See application file for complete search history.

(56) References Cited

U.S. PATENT DOCUMENTS 6,004,276 A * 12/1999 Wright ................... G16H 15/00
128/923
7,139,686 B1 * 11/2006 Critz ....................... G06F 30/20
703/2

(Continued)

FOREIGN PATENT DOCUMENTS

GB 2532743 6/2016

OTHER PUBLICATIONS

PCT International Search Report and Written Opinion in International Appln. No. PCT/US2019/038782, dated Sep. 6, 2019, 13 pages.

*Primary Examiner* — Hua Lu
(74) *Attorney, Agent, or Firm* — Pillsbury Winthrop Shaw Pittman LLP

(57) ABSTRACT

Methods, systems, apparatus, including computer programs encoded on computer storage media for using multiple data structures to correlate information from multiple distributed data sources. The method can include receiving a request to create a report data structure, generating first data representing a digital report template the generated first data including (i) a first digital template defining multiple keyed data fields that are configured to be dynamically populated and (ii) a second digital template defining one or more instances of static data that can each be selectively activated or deactivated based on the request, extracting keyed data and natural language data from files in one or more of the data sources, mapping the extracted data to the multiple keyed data fields of the report template, and generating a report data structure based on (i) the mapped data and (ii) static data that has been selectively activated based on the request.

11 Claims, 3 Drawing Sheets

(51) Int. Cl.
*G06F 16/23* (2019.01)
*G06F 40/40* (2020.01)
*G06F 3/0481* (2022.01)

(56) References Cited

U.S. PATENT DOCUMENTS

| | | | |
|---|---|---|---|
| 7,941,438 B2* | 5/2011 | Molina-Moreno | G06F 8/35 |
| | | | 717/109 |
| 8,185,553 B2* | 5/2012 | Cams | G16H 10/60 |
| | | | 707/808 |
| 8,365,138 B2* | 1/2013 | Iborra | G06F 16/2365 |
| | | | 717/113 |
| 8,775,960 B1* | 7/2014 | Flores | G06Q 10/06 |
| | | | 715/771 |
| 10,331,899 B2* | 6/2019 | Pattabhiraman | G06F 40/186 |
| 2002/0062475 A1* | 5/2002 | Iborra | G06F 8/35 |
| | | | 717/108 |
| 2002/0078158 A1* | 6/2002 | Brown | H04L 65/1101 |
| | | | 709/206 |
| 2003/0036925 A1* | 2/2003 | Miller | G16H 40/20 |
| | | | 705/2 |
| 2005/0039119 A1* | 2/2005 | Parks | G06F 40/12 |
| | | | 715/209 |
| 2005/0097122 A1* | 5/2005 | Schafflutzel | G06F 16/283 |
| | | | 707/999.102 |
| 2006/0259289 A1* | 11/2006 | Shia | G06F 8/10 |
| | | | 703/12 |
| 2007/0150241 A1* | 6/2007 | Critz | G06F 30/20 |
| | | | 703/2 |
| 2008/0022265 A1* | 1/2008 | Morris | G06F 8/41 |
| | | | 717/140 |
| 2008/0180733 A1* | 7/2008 | Imamichi | G03G 15/502 |
| | | | 358/1.15 |
| 2008/0275910 A1* | 11/2008 | Molina-Moreno | |
| | | | G06F 16/2365 |
| 2010/0198737 A1* | 8/2010 | Awad | G06Q 50/184 |
| | | | 705/310 |
| 2010/0293108 A1* | 11/2010 | Gurvitch | G06Q 40/04 |
| | | | 705/37 |
| 2010/0309926 A1* | 12/2010 | Sun | H04L 47/70 |
| | | | 370/401 |
| 2012/0051535 A1* | 3/2012 | Klein | G06Q 10/10 |
| | | | 379/243 |
| 2012/0066197 A1* | 3/2012 | Rana | G06F 16/93 |
| | | | 707/706 |
| 2012/0310923 A1* | 12/2012 | Ross | G06F 16/24556 |
| | | | 707/E17.061 |
| 2013/0124478 A1* | 5/2013 | Ginzburg | G06F 40/18 |
| | | | 707/639 |
| 2014/0171017 A1* | 6/2014 | Menezes | H04M 15/58 |
| | | | 455/406 |
| 2014/0379379 A1* | 12/2014 | Janevski | G16H 50/20 |
| | | | 705/3 |
| 2015/0046366 A1* | 2/2015 | Phadke | G06F 40/58 |
| | | | 705/342 |
| 2015/0148024 A1* | 5/2015 | Jiao | H04W 76/00 |
| | | | 455/418 |
| 2015/0347542 A1* | 12/2015 | Sullivan | G06F 16/2455 |
| | | | 707/602 |
| 2016/0321347 A1* | 11/2016 | Zhou | G06Q 30/0623 |
| 2017/0116202 A1* | 4/2017 | Pattabhiraman | G06F 16/25 |
| 2017/0140400 A1* | 5/2017 | Avera | G06Q 30/0202 |
| 2017/0160904 A1* | 6/2017 | Tene | G06F 3/0482 |
| 2017/0193848 A1* | 7/2017 | Bonney-Ache | H04L 67/306 |
| 2017/0286388 A1* | 10/2017 | Tamilarasan | G06F 3/0482 |
| 2018/0024983 A1* | 1/2018 | Guzman | G06V 30/416 |
| | | | 715/234 |
| 2018/0025063 A1* | 1/2018 | Gupta | G06F 16/2465 |
| | | | 707/722 |
| 2018/0336068 A1* | 11/2018 | Sandstrom | G06F 9/546 |
| 2019/0050771 A1* | 2/2019 | Meharwade | G06K 9/6276 |
| 2019/0073666 A1* | 3/2019 | Ortiz | H04L 9/0637 |
| 2019/0121827 A1* | 4/2019 | Boswell | G06F 40/143 |
| 2019/0227780 A1* | 7/2019 | Keyser | H04L 67/306 |
| 2019/0243841 A1* | 8/2019 | Hoffmann | G06F 16/30 |

\* cited by examiner

200

```
┌─────────────────────────────────────────────────────┐
│ RECEIVE A REQUEST TO CREATE A REPORT DATA STRUCTURE │
│                                                 210 │
└─────────────────────────────────────────────────────┘
                          │
                          ▼
┌─────────────────────────────────────────────────────┐
│ GENERATE A DIGITAL REPORT TEMPLATE, BASED ON THE    │
│ RECEIVED REQUEST, THAT INCLUDES (I) A FIRST DIGITAL │
│ TEMPLATE DEFINING MULTIPLE KEYED DATA FIELDS THAT ARE│
│ CONFIGURED TO BE DYNAMICALLY POPULATED USING        │
│ INFORMATION EXTRACTED FROM ONE OR MORE DATA SOURCES │
│ AND (II) A SECOND DIGITAL TEMPLATE DEFINING ONE OR MORE│
│ INSTANCES OF STATIC DATA THAT CAN BE SELECTIVELY    │
│ ACTIVATED OR DEACTIVATED BASED ON THE RECEIVED REQUEST│
│                                                 220 │
└─────────────────────────────────────────────────────┘
                          │
                          ▼
┌─────────────────────────────────────────────────────┐
│ EXTRACT KEYED DATA AND NATURAL LANGUAGE DATA        │
│ FROM FILES IN ONE OR MORE DATA SOURCES              │
│                                                 230 │
└─────────────────────────────────────────────────────┘
                          │
                          ▼
┌─────────────────────────────────────────────────────┐
│ MAP THE EXTRACTED DATA TO THE MULITPLE              │
│ KEYED DATA FIELDS OF THE REPORT TEMPLATE            │
│                                                 240 │
└─────────────────────────────────────────────────────┘
                          │
                          ▼
┌─────────────────────────────────────────────────────┐
│ GENERATING A REPORT BASED ON (I) THE MAPPED DATA AND (II)│
│ THE INSTANCES OF STATIC DATA THAT HAVE BEEN SELECTIVELY │
│ ACTIVATED BASED ON THE REQUEST                   250│
└─────────────────────────────────────────────────────┘
```

FIG. 2

APPLICATION PROGRAMMING INTERFACE USING DIGITAL TEMPLATES TO EXTRACT INFORMATION FROM MULTIPLE DATA SOURCES

CROSS-REFERENCE TO RELATED APPLICATIONS

This application claims the benefit of the U.S. Provisional Patent Application No. 62/689,050 filed Jun. 22, 2018 and entitled "APPLICATION PROGRAMMING INTERFACE USING MULTIPLE DATA STRUCTURES TO CORRELATE INFORMATION FROM MULTIPLE DISTRIBUTED DATA SOURCES," which is incorporated herein by reference in its entirety.

BACKGROUND

Multiple different entities such as companies, government agencies, non-governmental organizations, and even individuals can maintain sources of data. Such data sources can exist on the same network or different networks.

SUMMARY

According to one innovative aspect of the present disclosure, a method for using an application programming interface to obtain data from one or more data sources for use in generating a report data structure using multiple template data structures to extract information from the one or more data sources, the method comprising receiving a request to create a report data structure, generating first data representing a digital report template, based on the received request, the generated first data including (i) a first digital template defining multiple keyed data fields that are configured to be dynamically populated using information extracted from one or more data sources and (ii) a second digital template defining instances of static data that can each be selectively activated or deactivated based on the request, extracting keyed data and natural language data from files in one or more of the data sources, mapping the extracted data to the multiple keyed data fields of the report template, and generating a report data structure based on (i) the mapped data and (ii) at least one or more instances of the static data that have been selectively activated based on the request.

Other versions include corresponding systems, apparatus, and computer programs to perform the actions of methods defined by instructions encoded on computer readable storage devices.

These and other versions may optionally include one or more of the following features. In some implementations, the request includes additional information that describes a user response to one or more prompts.

In some implementations, the method can further include selectively activating the at least one or more instances of the static data based on the additional information.

In some implementations, the method can further include selectively deactivating one or more instances of the static data other than the at least one or more instances of the static data based on the additional information.

In some implementations, receiving, by an application server, a request to create a report data structure can include receiving, from a user device, data indicative of a user selection of a single graphical element provided for display in a graphical user interface, wherein the single graphical element is associated with identifying information indicating that selection of the single graphical element triggers generation of the report data structure.

In some implementations, mapping, by the application server, the extracted data to the multiple keyed data fields of the digital report template can include executing one or more logical relationships between (i) at least one keyed data field of the first digital template and a field of the extracted data. In such implementations, generating a report data structure based on (i) the mapped data and (ii) at least one or more instances of the static data that have been selectively activated based on the request can include populating the keyed data fields of the first digital template using extracted data that maps to the keyed data fields using the one or more the one or more logical relationships.

Numerous advantages are achieved as a result of the present disclosure. By way of example, the present disclosure enables the creation of a single report data structure from portions of multiple files that include unstructured information. In addition, the digital report templates described by the present disclosure significantly reduce the amount of time it takes to generate particular types of report data structure while at the same time improving the accuracy and consistency of the generated report data structures.

BRIEF DESCRIPTION OF THE DRAWINGS

FIG. 2 is a flowchart of a process for using an application programming interface that uses one or more digital templates to extract information from multiple data sources.

DETAILED DESCRIPTION

Figure 1:
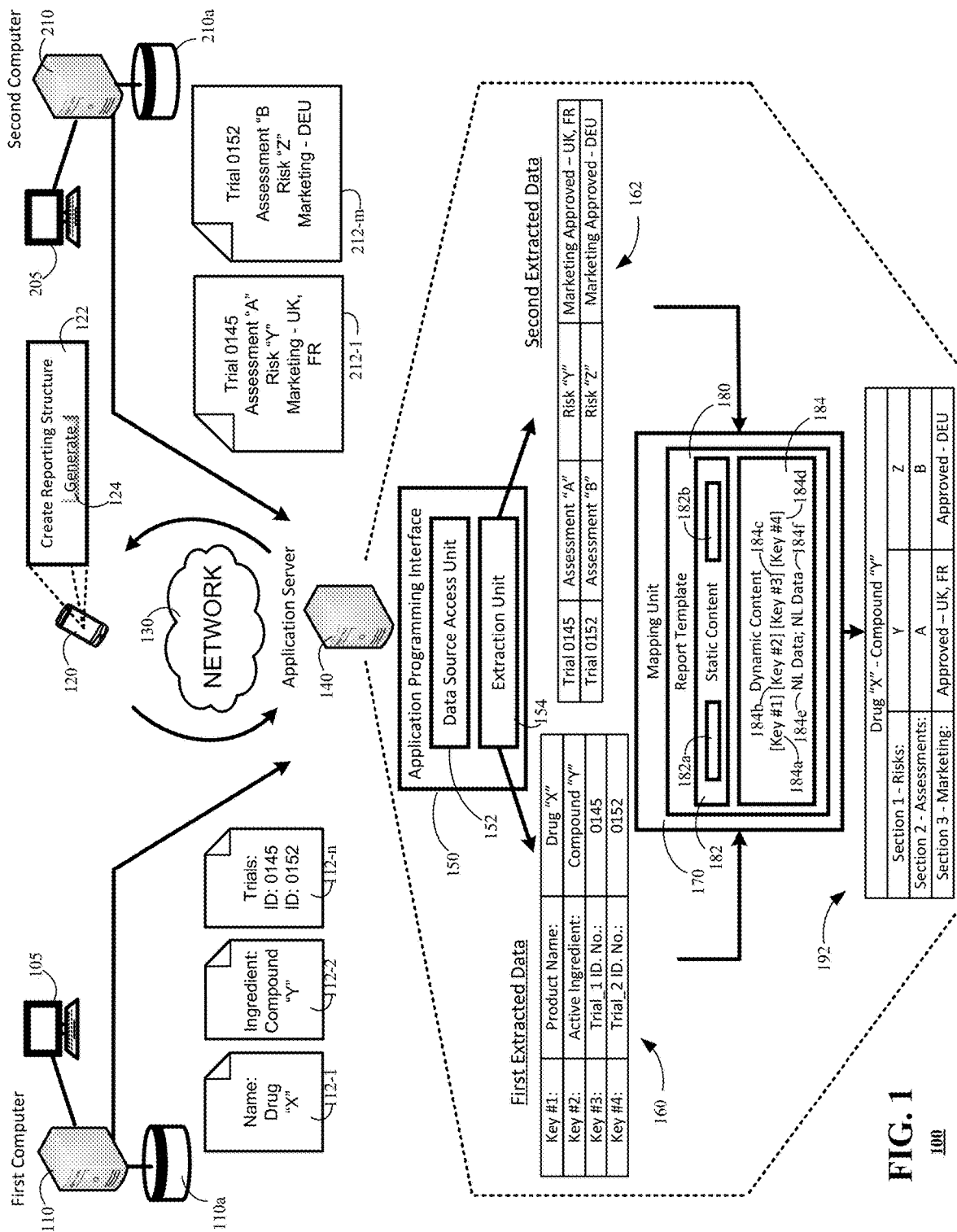
FIG. 1 is a contextual diagram of a system for using an application programming interface that uses one or more digital templates to extract information from multiple data sources.

FIG. 1 is a contextual diagram of a system 100 for using an application programming interface that uses one or more digital templates to extract information from multiple data sources. The system 100 includes a first data source 110a, a user device 120, a network 130, an application server 140, and a second data source 210a. A digital template can include, for example, a digital file or data structure enveloping (i) static data, (ii) one or more reference identifiers that can be processed to incorporate dynamic data into the digital template, (iii) or any combination thereof. In some implementations, a digital template can also include default data that is not static data or one or more reference identifiers.

Each of the data sources 110a, 210a can be maintained by one or more computers 110, 210 storing one or more types of files. The types of files can include documents, spreadsheets, PDFs, image files, slide-shows, or any other type of file. In some implementations, a data source such as the first data source 110a can be maintained by a single server computer 110 that includes one or more storage devices storing the one or more types of files. In other implementations, a data source such as the first data source 110a can be maintained by multiple servers that each include one or more storage devices that store a subset of the one or more types of files stored by the data source 110a. For example, one, or both, of the data sources 110a, 210a can be implemented using a cloud-based network of multiple servers.

Moreover, while two distributed data sources 110a, 210a are depicted, the present disclosure need not be so limited. For example, features of the present disclosure can also be applied to systems that include an application programming interface that uses one or more digital templates to extract information from a single data source, two data sources, three data sources, or more than three data sources.

Each data source 110a, 210a can store information received from one or more data originators. In some implementations, information stored in the data sources 110a, 210a can be originated from a user of a user terminal such as respective user terminals 105, 205. Such terminals 105, 205 can include any user device including a smartphone, a tablet, a laptop, a desktop, or the like. Alternatively, the information stored in the data sources 110a, 210a can be received across a network such as network 130 from one or more other computing devices.

In some implementations, the first data source 110a can include files originated by an entity such as a company that is in the pharmaceutical business. The company can have one or more employees or agents that use the terminal 105, or another computer, to create information such as files 112-1, 112-2, 112-n, wherein n is any positive, non-zero integer. The files can include structured, or unstructured, information having keyed values. The keyed values may include, for example, drug names of drugs under development by the company such as drug "X," ingredients used to make drugs manufactured by the company such as a compound "Y," and trial IDs that identify one or more clinical trials that are underway such as clinical trial 0145, clinical trial 0152, or the like. Alternatively, or in addition, the keyed values can include sentences, paragraphs, or other snippets of text included in one or more of the files 112-1, 112-2, 112-n. As such, any type of data in a file or any region of a file can be keyed. Data in a file or a region of a file can be referred to as keyed if the data in the file or the region of the file can be identified by a reference identifier. The first data source 110a may also be hosted on a network of the company that is not accessible by the user device 120 or terminal 205.

In some implementations, the second data source 210a can include a data source provided by an entity outside of the company that develops or manufactures the drugs. For example, the second data source 210a can store one or more files associated with an entity (or respective entities) that perform clinical trials, or other evaluations, on a drug developed by the company associated with the first data source 110a. However, it should be noted that neither the first data source 110a or the second data source 210a are limited to being provided by a pharmaceutical company and an entity outside the pharmaceutical company. Instead the first data source 110a and the second 210a can be used by any other entity, the same entity, or other different entities.

In some implementations, the second data source 210a can store natural language data such as clinical trial reports 212-1, 212-m, where m is any positive, non-zero integer. Each respective clinical trial report 212-1, 212-m can include natural language summaries of aspects of clinical trial results for drugs developed by the company. For example, the natural language summaries of the clinical trial reports 212-1, 212-m may include natural language descriptions of assessments of a drug under development by the company, natural language descriptions of risks associated with a taking of the drug under development by the company, jurisdictions where the drug developed by the company has been approved for marketing, or the like. The natural language summaries can include one or more sentences, one or more paragraphs, one or more bulleted lists, or the like. Though an example of natural language data is described here as including clinical trial reports, the present disclosure need not be so limited. Instead, the natural language data stored in the second data source can include previously generated safety reports, previously generated governmental reports, previously generated marketing reports, other types of previously generate reports, or the like. The second data source 210a can also be hosted on a network of the company that is not accessible by the user device 120 or terminal 105.

The application server 140 enables generation of a reporting data structure that includes information from each of the data sources 110a, 210a. The application server 140 enables such generation of a reporting data structure using one or more digital templates to extract information from each of the data sources 110a, 210a. Though the example of FIG. 1 describes an implementation where the data sources 110a, 210a are distributed, the present disclosure need not be so limited. Instead, the files described as being stored in distributed data sources 110a, 210a in FIG. 1 can also be stored in a single data source of a single computer. For purposes of the present disclosure, a "data source" can include a single file or a plurality of files.

With reference to the example of FIG. 1, the application server 140 includes an application programming interface 150 that is configured to obtain information from one or more data sources such as data sources 110a, 210a. The application programming interface 150 includes a data source access unit 152 and an extraction unit 154. For purposes of the present disclosure, a "unit" may include one or more hardware modules, one or more software modules, or a combination thereof. Hardware modules may include one or more processors, one or more memory units, a circuitry for interconnecting the one or more processors to obtain and execute programmed instructions, or a combination thereof. Software modules may include one or more computer program instructions that, when executed by the one or more hardware modules realize programmed functionality described by the program instructions.

The data source access unit 152 of the application programming interface 150 is configured to access each of the data sources 110a, 210a. In some implementations, the data source access unit 152 can access the data sources 110a, 210a based on receipt of data indicative of a command from the user device 120 that is received, by the data source access unit 152, across the network 130. For example, a user can select a graphical element 124 that visually identified in a graphical user interface 122 of the user device 120 as triggering generation of a reporting data structure. Though this example describes submission of a command to generate a reporting data structure that is submitted based on the selection of a graphical element 124, the present disclosure need not be so limited. For example, in other implementations, the command to generate a reporting data structure submitted by the user device 120 may be based on a voice command. In such implementations, a user may utter a command such as "generate reporting structure," a digital assistant executing on the user device 120 may detect the command "generate reporting structure," and, based on the detected command, the user device 120 may provide an instruction to the application server 140 to generate a reporting data structure.

Other types of input can also be used to trigger generation and transmission of an instruction to the application server 140 that instructs the application server 140 to use the application programming interface 150 to initiate the process of generating a report data structure. For example, a user could utter other commands that results in triggering generation of a reporting data structure such as "generate a safety report," "generate a safety report for drug 'X'," or the like. Yet other types of commands could be used to trigger generation of a reporting data structure other than a single selection of a graphical element 124 or a single uttered command. For example, the user device 120 can be configured using software programs, one or more sensors (e.g., one or more accelerometers, one or more gyroscopes, or both), or both, to respond to a particular input gesture such as a shaking of the user device 120, a particular type of finger swipe or multi-finger swipe, or other type of gesture, by triggering generation of a reporting data structure.

The command to generate a reporting data structure can be accompanied by additional information. The additional information can be input by a user of the user device 120 prior to the user of the user device 120 inputting the command to generate a report data structure. For example, in some implementations, prior to inputting a command to generate a report data structure, the user of the user device 120 can be prompted, by a user interface rendered on a display of the user device 120, to complete one or more fields of information related to the report data structure that is to be created. In some implementations, the user interface can generated using a web form. Each field can be configured to receive a user input that corresponds to a request for information such as a question or a prompt displayed by the user interface. By way of example, the user interface can request information from a user such as a drug or compound name such as Drug "X". In some implementations, the user interface can prompt the user for further information. For example, the user interface can prompt the user to input information such as (i) a reporting period, (ii) whether a previously generated report data structure has been generated for the compound, (iii) whether the product that includes the compound is authorized for marketing, (iv) whether any safety actions have occurred for the reporting period, or the like. In some implementations, the reporting period may be input using a reporting start date and a reporting end date. The user interface can also be designed to prompt a user for other information that can be used in generating a report data structure. The user's input to the one or more fields can be provided in a number of different ways. For example, the user can enter text into a field that spells a compound or drug name, enter text into a field that defines a reporting period, enter text into a field that describes whether a previously generated report data structure has been generated for the compound, or the like. Alternatively, or in addition, a user can input a response into one or more of the fields by making a selection from a drop down box, a selection of dates in a calendar, a selection of a radio button, or a selection of any other graphical elements of one or more graphical input tool(s) that can be designed to solicit input data from a user in response to an information request or prompt.

In yet other implementations, for example, the additional information may be information that relates to information that the user of the user device 120 is viewing, or has recently viewed, using the user device 120. In such implementations, after a user inputs a command to generate the report data structure, the user device can (i) obtain data such as a drug name, drug identifier, or the like that is displayed on the graphical user interface or (ii) obtain data such as a drug name, drug identifier, or the like that is stored because the drug name, drug identifier, or the like is determined to be related to information that is currently displayed by the graphical user interface though the drug name, drug identifier, or the like may not necessarily be displayed.

In yet other implementations, the additional information can be obtained from a page the user is currently at the time the user submits a command to generate a report data structure. For example, a user may be viewing a page about a drug or compound and select the graphical element 124 to trigger generation of a report structure. In such implementations, the paged viewed by the user can include information such as one or more of information describing a particular reporting period related to a drug, information describing an occurrence of a safety incident related to a drug, information describing a lack of occurrences of a safety incident related to the drug, information describing whether a report data structure was previously generated for the drug or compound, information describing whether safety actions were reported during the reporting period, or the like.

In such implementations, the user device 120 can obtain such information related to the drug or compound that is displayed by the page the user is viewing in response to a user's input of a command to generate a report data structure for the drug or compound described by the page the user is viewing. The obtained information can be provided as additional information to the command to generate a reporting structure for the drug or compound in lieu of the user overtly entering the information into fields of a form or in addition to the information the user has previously entered into fields of a form. In some implementations, this may be achieved by the user device 120 being configured to identify and obtain information related to a drug or compound from a page being viewed by the user, storing the obtained information in a memory location, and then obtaining the stored information from the memory location. The information obtained from the memory location can then be provided to the application server 140 with the command to generate a reporting structure.

In the example of system 100, the user device 120 can be a device such as a smartphone. However, the present disclosure need not be so limited. Instead, the user device 120 may include a tablet computer, a laptop computer, a desktop computer, or any other type of user device.

Moreover, it is noted that the example of system 100 is being described with reference to generation of a reporting data structure for a drug or compound. In addition, aspects of this example related to generating a reporting structure that includes information related to the drug's safety, the drug's efficacy, or both. However, the present disclosure need not be so limited. Instead, the system 100 can be used to generate a reporting structure about any object, product, or entity having information stored about the object, product, or entity in one or more data sources.

The command from the user device 120 may be communicated across the network 130 to the application server 140. The network 130 may include, for example, one or more wireless networks, one or more wired networks, one or more LANs, one or more WANs, one or more cellular networks, the Internet, or any combination of thereof. In addition to allowing the user device 120 to communicate with the application server 140, the network 130 may also be used by the application server 140 to communicate with the one or more computers 110, 210 that store the data sources 110a, 210a.

In some implementations, at least a portion of the network 130 may be used by the terminal 105 to communicate with a computer 110 storing the first data source 110a and another portion of the network 130 may be used by the terminal 205 to communicate with the computer 210 storing the second data source 210a. In other implementations, a first private LAN or a first VPN or a first TLS may be used for communication between the terminal 105 and the computer 110 storing the first data source 110a and a second private LAN or second VPN or a second TLS may be used for communication between the terminal 205 and the computer 210 storing the second data source 210a. In such implementations, the first data source 110 and the terminal 105 may be viewed as being part of a first network and the second data source 210 and the terminal 205 may be viewed as being part of a second network that is different than the first network.

A digital report template 180 can be defined responsive to receipt, by the application server 150, of the command to generate a report data structure. The digital report template 180 is a digital template that envelopes one or more other digital templates 182, 184 that define the static content and the dynamic content of the digital report template 180. Defining the digital report template 180 can include (i) selectively activating or deactivating static content of a first digital template 182 based on the additional information received with the command, (ii) dynamically configuring a second digital template 184 to include one or more references identifiers 184a, 184b, 184c, 184d, 184e, 184f based on the additional information received with the command, or (iii) a combination of both. The reference identifiers 184a, 184b, 184c, 184d, 184e, 184f can be processed to pull data into the digital report template 180 from one or more data sources 110a, 210a. A report data structure 192 can be generated as a result of the selective activation of the static content and the dynamic incorporation of dynamic content using the reference identifiers.

The defined digital report template 180 includes the static content and the dynamic content. Static content can include optional content that is already laid in a report template of which only a subset of such static content is activated for display that is related or relevant to the additional information received with the command to generate a report data structure. The subset of such static content that is not related or relevant to the additional information can be deactivated in the digital template 182. Dynamic content can include content that is extracted from one or more of the data sources 110a, 210a. Such dynamic content can be extracted using one or more reference identifiers 184a, 184b, 184c, 184d, 184e, 184f that can be logically related to data from the one or more data sources 110a, 210a. The one or more reference identifiers 184a, 184b, 184c, 184d, 184e, 184f can each identify one or more keyed data items or types of natural language data that are to be included in the report data structure 192. Information extracted, by the extraction unit 152, from files accessed by the data source access unit 152 can be dynamically mapped to the reference identifiers 184a, 184b, 184c, 184d, 184e, 184f using the mapping unit 170. In some implementations, the static content can also include dynamic content. That is, a portion of static content in a digital template 182 can be selectively activated (or deactivated) in a digital template 182 and also include one or more reference identifiers that enable the static content to be supplemented by dynamic content using the one or more reference identifiers, if the static content having the one or more reference identifiers is activated based on received additional information.

With reference to the example of FIG. 1, a first digital template 182 can be configured to add static content 182a, 182b to the report template 180. The first digital template 180 can be selectively configured based on the additional information received by the application server 140 with the command to create a report data structure 192. For example, the application server 140 can dynamically select static content 182a, 182b from the first digital template 180 that is activated based on the additional information received from the user device 120 with the command to create the report data structure 192. In some implementations, the application server 140 can determine which static content items 182a, 182b are to be activated by applying one or more business rules to the additional information received by the application server 140 with the generate report data structure command. In some implementations, the static information can include dynamic content.

A second digital template 184 can be used to facilitate the incorporation of dynamic content into the report template 180. The type of dynamic content that the report template 180 can be configured to incorporate is data driven content that is based on data extracted, by the data extraction unit 154, from the files accessed by the data source access unit 152. The second digital template 184 can dynamically configured to include a particular set of reference identifiers 184a, 184b, 184c, 184d, 184e, 184f based on the additional information received by the application server 140 with the command to generate a report data structure. In some implementations, the application server 140 can apply one or more business rules to responses provided by the user of the user device 120 received by the application server 140 as additional information to the generate report data structure command.

The reference identifiers 184a, 184b, 184c, 184d, 184e, 184f can include reference keys 184a, 184b, 184c, 184d that correspond to keyed information in one or more of the files 112-1, 112-2, 112-n accessed by the data source access unit 152. A reference key 184a, 184b, 184c, 184d may correspond to a particular data item in a file 112-1, 112-2, 112-n such as a row of a table included in one of the files 112-1, 112-2, 112-n that is to be incorporated into the report template 180. Alternatively, or in addition, the reference identifiers may reference data 184e, 184f that correspond to natural language information included in one or more of the files 212-1, 212-m accessed by the data source access unit 152. Reference data 184e, 184f can identify sections, subsections, or the like of a file 212-1, 212-m that is to be dynamically incorporated into the report template 180. Each reference identifier 184a, 184b, 184c, 184d, 184e, 184f can identify a location within the report template 180 where the extracted data 160, 162 that corresponds to the reference key is to be inserted.

Accessing information stored by the first data source 110a and the second data source 210a to populate reference identifiers of the digital report template 180 and generate the report data structure 192 can be performed in a number of different ways. In some implementations, the request can include a request for access to one or more files associated with a reference identifier in a digital report template used to generate the report data structure. Such a request may include one or more identifier identifying the one or more files, one or more identifiers identifying a portion of the one or more files, or both. A file can be associated with a reference identifier in a digital report template if the reference identifier calls for information from the file. In some implementations, a reference identifier can call for information from the file if there is a logical relationship that has been created between the reference identifier the file. In other implementations, a reference identifier can call for information from the file if a reference identifier includes a file identifier that identifies the file.

In some implementations, the data source access unit 152 can transmit a request to each of the computers 110, 210 storing the data sources 110a, 210a for access to the files stored in each respective data sources 110a, 210a. In some implementations, the request may include a drug identifier such as a name of the drug, product code for the drug, or the like. The drug identifier may be based on the drug name, drug identifier, or other additional information received in the command from the user device 120 that triggers generation of the report data structure.

In some implementations, the request for access from the data source access unit 152 may include authentication information that is necessary to access the first data source 110a, the second data source 120a, or both. The authentication information may include information such as a username, passcode, or the like. Alternatively, or in addition, the authentication information may include a public key, private key, or both, that may be used to access information that has been encrypted.

In response to the request for access from the application server 140, the computers 110, 210 storing the data sources 110a, 210a can provide information that is responsive to the request. Information responsive to the request may include information related to the drug identified in the request for access provided by the application server 140. For example, the computer 110 storing the first data source 210a can provide files 112-1, 112-2, 112-n, or portions thereof, and the computer 210 storing the second data source 210 can provide files such as clinical trial reports 212-1, 212-m, and portions thereof. The data source access unit 152 can receive the files 112-1, 112-2, 112-n and files such as clinical trial reports 212-1, 212-m from the computer 110 storing first data source 110a and the computer 210 storing the second data source 210a, respectively. In some implementations, the files received from one or more of the data sources can include files other than clinical trial reports. For example, the files received can include safety reports, other types of reports, other types of documents, spreadsheets, presentations, PDFs, or the like.

In yet other implementations, the data source access unit 152 need not retrieve files 112-1, 112-2, 112-n or files 212-1, 212-m from remote, distributed data sources 110a, 210a. Instead, data source access unit 152 can be configured to receive uploaded files users of terminals 105, 205 respectively, for storage by the application server 140. In such implementations, the files described as being stored by the data sources 110a, 210a can instead be stored on the server 140. In such implementations, the data source access unit 152 can access and retrieves files stored locally on the application server 140.

The extraction unit 154 can extract information from the files received by the data source access unit 152. For example, the extraction unit 154 can access the files 112-1, 112-2, 112-n and files such as clinical trial reports 212-1, 212-m received by the data source access unit 152 from the first data source 110a and the second data source 210a respectively. The files can include documents, spreadsheets, PDFs, image files, slide-shows, or any other type of file. The extraction unit 154 is configured to extract a subset of the information from files received by the data source access unit 152. Extracting a subset of the information from files received by the data source access unit 152 may include (i) extracting a subset of information from one or more of the files corresponding to one or more keyed values associated with a reference identifier of the digital report template, (ii) extracting a subset of information from one or more of the files using natural language processing techniques, or a combination thereof.

The mapping unit 170 can execute logical relationships between (i) the reference identifiers 184a, 184b, 184c, 184d, 184e, 184f included in the second digital template and (ii) one or more portions of the one or more files 112-1, 112-2, 112-n, 212-1, 212-m to map data extracted from the one or more portions of the one or more files to the reference identifiers of the second digital template. The one or more files can include, for example, a document, spreadsheet, pdf, slideshow, or the like that includes data called for by the reference key. The one or more portions of the one or more files can include a field, a phrase, a sentence, a bulleted list, a fields of a table, a row of a table, a column of a table, a table, a graph, a page of data, or any other portion of a data source. The one or more portions of the one or more files can include (i) region of the file such as a page, field, row or column or (ii) the data encompassed within the region of the file. In some implementations, the logical relationships between each particular reference identifier and one or more portions of a file of a data source can be predefined. For example, the logical relationship between a particular reference identifier and a portion of a file can include a predefined query.

The logical relationship can include, for example, a linkage established using digital executable logic between a reference identifier of a digital template and a portion of a data source. Such digital executable logic can establish a logical relationship between a reference identifier and a region of the file that, when the digital executable logic is executed by a computer, causes data encompassed within a region of the file to be extracted from the file and inserted into a portion of the digital report template where the reference identifier is located. However, in some implementations, there is no requirement that data extracted from a file be placed in the same location of a digital report template as the reference identifier to which it is logically linked. For example, in some implementations, the reference identifier can include one or more rules that describe a placement of the extracted data within the digital report template.

In some implementations, the reference identifier can also be associated with other rules that can be applied to extracted data such as formatting rules that are configured to change the formatting of extracted data. Formatting of the extracted data can include formatting to font, accents, spacing, indentations, or the like. In yet other implementations, the reference identifier can indicate placement of data extracted from the one or more files into a separate report data structure that is to be generated based on the digital report template.

Data from one or more portions of the files 112-1, 112-2, 112-n can be mapped to the reference identifiers 184a, 184b, 184c, 184d, 184e, 184f. For example, the mapping unit 170 can execute logical relationships that correlate the reference keys 184a, 184b, 184c, 184d with corresponding key-value attributes that can be extracted from the files 112-1, 112-2, 112-n by the extraction unit 154. For example, the mapping unit 170 can determine that the reference key "Key #1" 184a corresponds to a key identifier from file 112-1 such as "Product Name:," having a key value such as product name "X". Likewise, in this example, the mapping unit 170 can determine that the reference key "Key #2" 184b corresponds to a key identifier from file 112-2 such as "Active Ingredient:" having a key value such as compound "Y". Likewise, in this example, the mapping unit 170 can determine that the reference key "Key #3" corresponds to a key identifier from the file 112-*n* such as "Trial_1 ID. NO.:" having a key value such as "0145." Likewise, in this example, the mapping unit 170 can determine that the reference key "Key #4" corresponds to a key identifier from the file 112-*n* such as "Trial_2 ID. NO.:" having a key value such as "0152."

The extraction unit 154 can be configured to extract the data from the file that is called for by the reference key. By way of example, the data extraction unit 154 can identify textual content, Tables, Figures, dates, safety events, counts, aggregate safety events, and extract particular natural language data from the clinical trial reports 212-1, 212-*m* or from other documents, such as previously completed report of the same type, or DSURs, PSURs, etc. For example, the data extraction unit 154 can analyze the natural language information of the clinical trial reports 212-1, 212-*m* and determine portions of the natural language text related to risk levels associated the drug in the clinical trial, assessments of the drug in the clinical trial, jurisdictions where marketing for the drug have been approved, or other types of natural language information conveyed in the clinical trial reports 212-1, 212-*m* about the drug studied during the clinical trial. Extracting data from the file may include obtaining a copy of the data from the file. The extracted data can be inserted into the report template at the location where the reference key corresponding to the extracted data is located or at another location specified by the reference key. In some implementations, the extraction unit 154 can extract data from the one or more files after the one or more logical relationships are generated. In other implementations, however, the extraction unit 154 can be configured to extract information described by one or more reference identifiers In some implementations, the mapping unit 170 can use one or more of the keyed values obtained using the reference keys 184*a*, 184*b*, 184*c*, 184*d* to determine relevant information for extraction from another second data source 210*a*. For example, the mapping unit 170 can instruct the extraction unit 154 to use one or more keyed values as search terms that, when executed as a parameter of a search query, can identify relevant information for extraction from files such as clinical trial reports 212-1, 212-*m* obtained from the second data source 210*a*. The keyed values obtained from the one or more files from a first data source 110*a* can thus be used to extract relevant information from natural language data in a second data source 210*a* that is not keyed and not otherwise available to the first data source 110.

In some implementations, the mapping unit 170 can determine that further natural language processing needs to be performed on the keyed data that is obtained using the reference keys 1841, 184*b*, 184*c*, 184*d*. In some implementations, the further natural language processing can be performed because the extracted data includes cumulative data. In such instance, the mapping unit 170 can use natural language processing to refine the extracted data into a format that is to be included into the report template 180. Such natural language processing techniques may include analyzing text to detect relevant portions based context, pattern recognition, regular expressions, identification of content markers or the like. For example, the extraction unit 152 may identify relevant sections of a clinical trial document such as sections related to drug assessments, drug risk, drug marketing, or any other section or category. Once the section is identified, the natural language processor can perform one or more of these natural language processing techniques to extract only a portion of the data from the section that is called for by one or more reference keys 184*a*, 184*b*, 184*c*, 184*d*, 184*e*, 184*f*. In other implementations, additional natural language processing may be performed to format keyed data obtained using the reference keys 184*a*, 184*b*, 184*c*, 184*d* as specified by the report template 180.

In the example of FIG. 1, the data source access unit 152 can access files such as clinical trial reports 212-1, 212-*m* from a second data source 210*a* that include relevant natural language data such as text excerpts describing an evaluation of the drug "X" during respective clinical trials. However, the present disclosure need not be so limited to accessing clinical trial reports. Instead, the files 212-1, 212-*m* can include any type of file such as a document, spreadsheet, PDF, slideshow, or the like that includes relevant natural language data related to an evaluate of the drug "X" during respective clinical trials. The natural language data of the files 212-1, 212-*m* can be extracted using natural language processing techniques such as performing search and analysis of all, or a portion of, the text of one or more sections of the natural language of clinical trial reports 212-1, 212-*m* for the occurrence of relevant search terms or phrases, patterns of search terms or phrases, or the like. The occurrence of search terms or phrases in the natural language data may be analyzed based on their syntax (e.g., grammatical structure), semantics (e.g., actual meaning), pragmatics (e.g., purpose or goal), or a combination thereof. Though shown as separate files 212-1, 212-*m*, the present disclosure need not be so limited. For example, the natural language data from the second data source can reside within a single file such as a single document, a single spreadsheet, a single PDF, a single slideshow, or the like. The natural language data that was extracted from the clinical trial reports 212-1, 212-*m* using the extraction unit 154 can be added to the report template 180 as dynamic content.

Alternatively, or in addition, the second digital template 184 can include on or more reference identifiers such as reference data 184*e*, 184*f* that identify locations of one or more files accessed by the data source access unit that include natural language data that is to be inserted into the report template 180. For example, the reference data 184*e*, 184*f* can identify a section of a file, subsection of a file, or the like that includes natural language data for insertion into the report template 180. The mapping unit 170 can instruct the extraction unit 154 to extract the natural language data from the one or more files that are identified by the reference data 184*e*, 184*f* for inclusion in the report template 180.

The mapping unit 170 is configured to process the first digital template 182 and the second digital template 184 to generate a report data structure 192. For example, the mapping unit 170 can correlate reference identifiers of one or more of the digital templates and using logical relationships generated between fields of the respective digital templates 182, 184 and one or more files accessed by the data source access unit 152. In some implementations, the report template 180 may include a predetermined set of fields defined by the first digital template 182 and the second digital template 184 that are each configured to map to respective fields of one or more portions of files 112-1, 112-2, 112-*n*, 212-1, 212-*m*. In some implementations, the mapping such as one or more logical, mathematical, or statistical relationships that map fields of the report template 180, the first digital template 182, and the second digital template 184 to one or more source files can be predefined and is stored in a database such as MySQL database.

The mapping unit 170 can generate a reporting structure 192 executing the generated logical, mathematical, or statistical relationships between (i) reference identifiers of the second digital template 184 and (ii) one or more source files 112-1, 112-2, 112-*n*, 212-1, 212-*m*. Executing the generated logical, mathematical or statistical relationships between (i)

the reference identifiers and (ii) the one or more sources files maps the dynamic content into the digital report template 180 to accompanying the selectively activated static content of the digital report template 180 to create the report data structure 192. The created report data structure 192 includes an aggregated report data structure that includes keyed data and natural language data from the data sources 110a, 210a. The report data structure aggregates this information in response to a single command received from the user device 120 without the user device 120 being able to access either of the first data source 110 or the second data source 210.

In some implementations, a report data structure 182 can be generated in stages. For example, while a complete mapping between input files and user responses to output report can be stored in a database, the tool is also configured to facilitate generation of a partial report data structure. A partially completed report data structure is generated when only a subset of input documents are input or only a subset of user responses have been specified. Such partially completed reports allows all users to keep the report status current and review the report. In some implementations, a partially completed report can be used as a template in this application. A partially complete report can serve as an initial report template for a subsequent more completed reports.

The reporting structure 192 includes a summary of the clinical trial results for the drug "X" having an active ingredient of compound "Y." Moreover, the reporting structure 192 provides a hybridized reporting structure that includes keyed data from the first data source 110 with natural language data from the second data source 210a. Though the example of FIG. 1 only provides the examples of keyed data that include a product name, compound name, and clinical trial identifiers, the present disclosure need not be so limited. Instead, any type of keyed data from the first data source 110a may be included in the reporting structure 192. Also, though the reporting structure 182 is shown in FIG. 1 as not including the keyed data representing the clinical trial identifiers, such clinical trial identifiers may also be added to the reporting structure 192 as identifying the clinical trial reports from which the natural language data was extracted.

The reporting structure 182 may have multiple sections that are defined by the report template 180. In some implementations, each of the sections of the reporting structure 192 may be populated. However, in other implementations, only a subset of the sections may be included. In some implementations, only a subset of the sections may be relevant if a command from the user device 120 indicates that the section should not be included. By way of example, a user may provide additional information along with a command to generate a reporting structure indicating that marketing information is not required. Such additional information may be provided, for example, via the selection of one or more radio buttons, via the selection of a data in a drop down selection box, via a parameter of a query, via a voice command, or the like prior to transmitting an instruction to the application server 140 to generate a reporting structure 192.

By way an alternative example to FIG. 1, additional information received with the command to generate the reporting structure 192 can indicate that the compound "Y" has not yet been approved for marketing. Accordingly, in such implementations, the mapping unit 170 can determine to not include section 3 in the reporting structure 192 because the command received from the user specified that such marketing data was not needed, since the compound "Y" has not been approved for marketing. While this is an example of an explicit request to not include a section of the report by a user, the present disclosure need not be so limited. Instead, in some implementations, the mapping unit may implicitly determine, based on the command from the user device, that one or more sections of the reporting structure 192 are note needed. Generating a reporting structure with only a subset of the sections of the reporting structure 192 can result in performance improvements to the computing system 100 because the application server 140 uses less resources to generate the reporting structure 192 since less data is being processed absent one or more sections of the reporting structure.

Once the reporting structure 182 is generated, the application server 140 can provide data representing the reporting structure 182 to the user device 120. In some implementations, this may include the application server generating rendering data that, when rendered by the user device 120, causes the user device 120 to display the reporting structure in the graphical user interface of the user device 120. In other implementations, the reporting data structure 192 may be encoded into audio data that, when processed by the user device 120, causes the user device 120 to a vocal description of the reporting structure 192 via a speaker of the user device 120. Once generated, the data representing the reporting structure 192 is provided to the user device 120 using the network 130.

The distributed architecture of system 100 has multiple advantages. For example, each distributed terminal 105, 205 can be used to create, process, and manage information that is stored on the respective data source 110a, 210a to which the terminal has access. Such creating, processing and managing of information a terminal on only the database of information that the terminal can access enable creating, processing, and managing information close to the source without interacting with a centralized data store. Then, upon request, or as otherwise needed, the application server 140 can obtain and correlate data from each distributed data source in a manner that reduces the amount of bandwidth necessary to respond to a user request.

Importantly, the distributed nature of the data creation, data gathering, data filtering, and data searching described herein enables load distribution. Each particular terminal computer 105, 205 can solely generate, access, and manipulate data granularly by only interacting with the data associated with the particular data source 110a, 210a that the respective terminal can access. This helps to use available network bandwidth more efficiently. For example, instead of a terminal 105, 205 needing to create, access, and manipulate data in a central data store, each respective terminal 105, 205 can create, access, and manipulate data at their node of a distribute network that avoids the congestion of a single network bottleneck at the centralized server.

On the other hand, correlation of information records by the application server 140, as described herein, enables the application server 140 to provide all the benefits of a centralized storage location—e.g., a single repository that can receive a single query (or single instruction) and provide a single set of search results such as a structured report that a user needs responsive to the query (or instruction) without the drawbacks of massive record flows through a single network bottleneck. Moreover, implementing a system where a query (or instruction) from a single user interface can result in the search of multiple distributed databases and instigate generation of a single set of search results being received in a single interface on a client device is more resource efficient for the client device than a system that would require a user device to use multiple interfaces, multiple applications, and submit multiple queries yielding multiple results. Thus, a user device using the system and method described above can use less system resources due to the nature of the system and method.

Finally, the distributed fashion of the system and method described above also provides additional advantages for network devices and data gatherers. Though the system described above only includes two distributed data sources, the present disclosure need not be so limited, instead, the application server may correlate information records from three, four, five, or many more data sources and generate a respective template data structure for each of three, four, five, or many more data sources that can be used to correlate and map distributed data to the report data structure.

FIG. 2 is a flowchart of a process 200 for using an application programming interface that uses one or more templates to extract information from multiple data sources. The process 200 includes receiving a request to create a report data structure (210), generating first data representing a digital report template, based on the received request, the generated first data including (i) a first digital template defining multiple keyed data fields that are configured to be dynamically populated using information extracted from one or more data sources and (ii) a second digital template defining one or more portions of the digital report template defining multiple instances of static data that can each be selectively activated or deactivated based on the request (220), extracting keyed data and natural language data from files in one or more of the data sources (230) mapping the extracted data to the multiple keyed data fields of the report template (240), and generating a report data structure based on (i) the mapped data and (ii) the static data that have been selectively activated based on the request (250). The process 200 will be described below in more detail as being performed by a system such as the system 100 of FIG. 1.

The system can begin performance of the process 200 by receiving 210 a request to create a report data structure. Receiving the request, from a user device, to create the report data structure can include receiving one or more instructions to generate a report data structure that are triggered based on a command from a user device. In some implementations, the command can include data indicating a selection of a single graphical element selected by a user of the user device. The received request can include additional information that was input by the user into the user device prior to selection of the single graphical element. Additional information can include, for example, describing an occurrence of a safety incident related to a drug, information describing a lack of occurrences of a safety incident related to the drug, information describing whether a report data structure was previously generated for the drug or compound, information describing whether safety actions were reported during the reporting period, or the like.

The system can continue performance of the process 200 by generating first data 220 representing a digital report template, based on the received request. The generated first data can include (i) a first digital template defining multiple keyed data fields using one or more reference identifiers that are configured to be dynamically populated using information extracted from one or more data sources and (ii) a second digital template defining one or more portions of the digital report template defining multiple instances of static data that can each be selectively activated or deactivated based on the request. In some implementations, selectively activating or deactivating the static data can be achieved based on the additional information received in the request. In some implementations, the static data can include dynamic data.

The system can continue performance of the process 200 by extracting 230 keyed data and natural language data from files in one or more of the data sources. Keyed data or natural language data can be extracted from the one or more files of the data sources by identifying the textual information from the one or more files of the data sources that corresponds to the one or more reference identifiers and making a copy of the identified textual information from the one or more files.

The system can continue performance of the process 200 by mapping 240 the extracted data to the multiple keyed data fields of the report template having one or more reference identifiers. In some implementations, this can be achieved by executing one or more logical relationships that provide a linkage between the keyed data fields of the report template having one or more reference identifiers and a portion of a file of a data source.

The system can continue performance of the process 200 by generating 250 a report data structure based on (i) the mapped data and (ii) the static data that have been selectively activated based on the request. The report data structure can include the digital report template that has been transformed into the report data structure by mapping data from one or more files to each of the keyed data fields of the digital report template and selectively activating static data that is related or relevant to the additional information received along with the request to create the structured data report.

Figure 3:
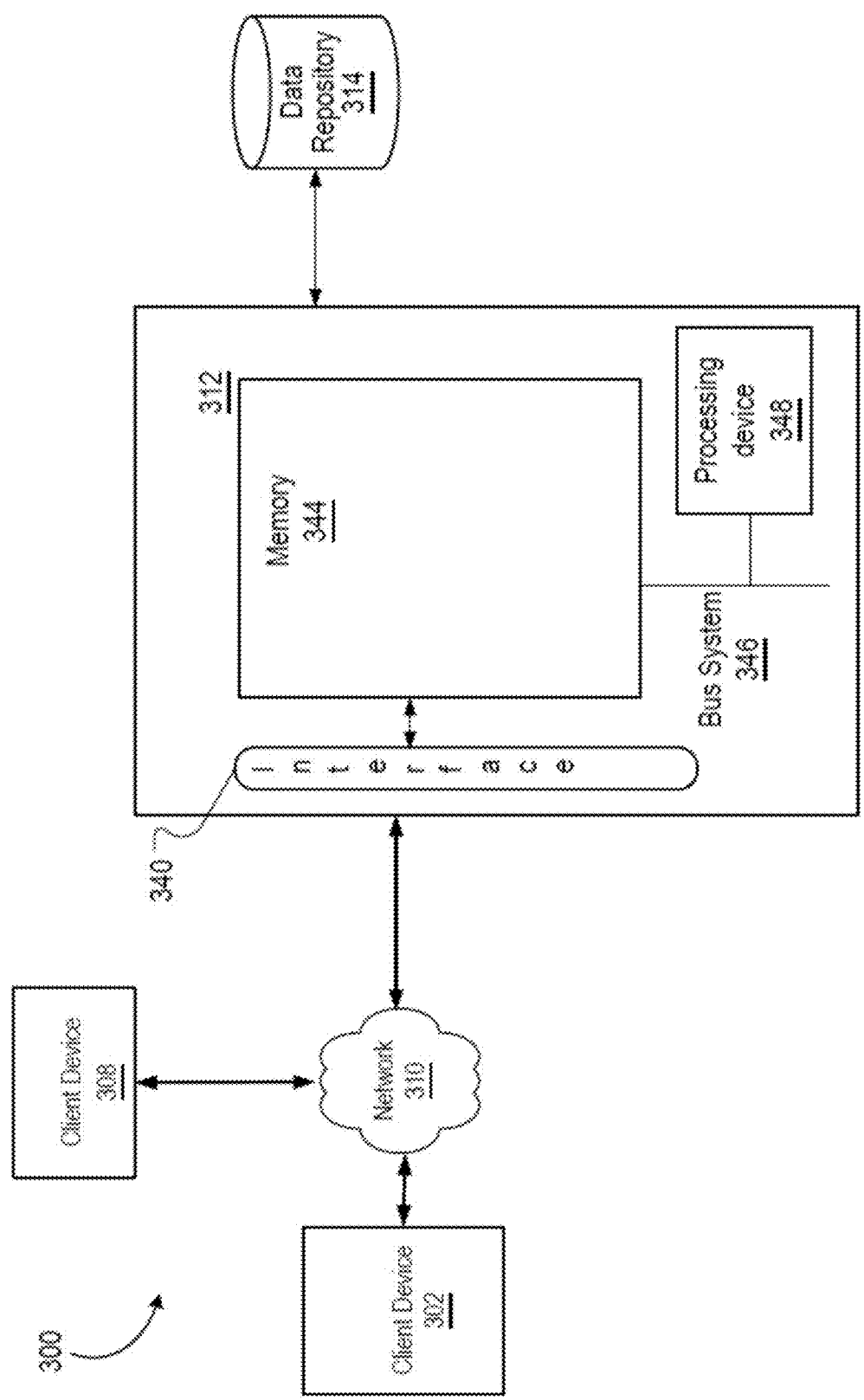
FIG. 3 is a diagram of system components that can be used to implement a system for using an application programming interface that uses one or more digital templates to extract information from multiple data sources.

FIG. 3 is a diagram of system components that can be used to implement a system for using an application programming interface that uses multiple data structures to correlate information from multiple distributed data sources.

In FIG. 3, client devices 302, 308 can be any sort of computing devices capable of taking input from a user and communicating over network 310 with server 312 and/or with other client devices. For example, client devices 302, 308 can be mobile devices, desktop computers, laptops, cell phones, personal digital assistants ("PDAs"), servers, embedded computing systems, and so forth. In some implementations, the client devices 302, 308 include one or more computers capable of generating an augmented reality environment, a virtual reality environment, or other form of mixed reality environment.

In an example, the client devices 302 and 308 are configured to present one or more graphical users interfaces to their respective users. In a particular example, the client devices 302 and 308 have been installed with an application or other executable code. The application or executable code can cause presentation of the graphical user interfaces when the application or executable code is executed, e.g., by a processing device 348.

Server 312 can be any of a variety of computing devices capable of receiving data, such as a server, a distributed computing system, a desktop computer, a laptop, a cell phone, a rack-mounted server, and so forth. Server 312 may be a single server or a group of servers that are at a same location or at different locations.

In general, the server 312 can serve as platform for the system 300 whereby users can connect with each other and share information. In an example, each of the client devices 302 and 308 can communicate with the server 312 and provide data indicative of a recovery log or other status updates to the server 312.

The illustrated server 312 can receive data from client devices 302, 308 via input/output ("I/O") interface 340. I/O interface 340 can be any type of interface capable of receiving data over a network, such as an Ethernet interface, a wireless networking interface, a fiber-optic networking interface, a modem, and so forth. Server 312 also includes a processing device 348 and memory 344. A bus system 346, including, for example, a data bus and a motherboard, can be used to establish and to control data communication between the components of server 312.

The illustrated processing device 348 may include one or more microprocessors. Generally, processing device 348 may include any appropriate processor and/or logic that is capable of receiving and storing data, and of communicating over a network (not shown). Memory 344 can include a hard drive and a random access memory storage device, such as a dynamic random access memory, or other types of non-transitory machine-readable storage devices. Memory 344 stores computer programs (not shown) that are executable by processing device 348 to perform the techniques described herein. Memory also stores executable logic that is executable by processing device 348 to implement to a psychiatric treatment recommendation generation system and to implement the other functionality described herein.

Embodiments can be implemented in digital electronic circuitry, or in computer hardware, firmware, software, or in combinations thereof. Apparatus of the invention can be implemented in a computer program product tangibly embodied or stored in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, of a functional language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD ROM disks. Any of the foregoing can be supplemented by, or incorporated in, ASICs (application-specific integrated circuits).

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments of the invention have been described. Other embodiments are within the scope of the following claims. For example, the actions recited in the claims may be performed in a different order and still achieve desirable results.

The invention claimed is:

1. A system for using an application programming interface to obtain data from one or more data sources for use in generating a report data structure using multiple template data structures to extract information from the one or more data sources, the system comprising:
   one or more processors; and
   one or more computer storage media, the computer storage media comprising instructions that, when executed by the one or more processors, cause the one or more processors to:
   obtain a request to create the report data structure;
   obtain additional information related to the request, wherein the additional information includes data that identifies a drug or compound that is a candidate treatment for an ailment;
   obtain, based on the additional information, one or more reference identifiers, wherein the one or more reference identifiers identify one or more data sources storing clinical trial data related to the drug or compound;
   generate, based on the one or more reference identifiers, a first digital template defining multiple keyed data fields that are configured to be dynamically populated using information extracted from the one or more data sources;
   generate, based on the additional information that identifies the drug or compound that is the candidate treatment the ailment, a second digital template defining instances of static data that are to be selectively activated based on whether or not the static data is relevant or related to the additional information;
   extract keyed data and natural language data from files in the one or more data sources;
   map the extracted data to the multiple keyed data fields in the first digital template; and
   generate the report data structure based on (i) the mapped data and (ii) at least one or more instances of the static data that have been selectively activated based on the one or more reference identifiers.

2. The system of claim 1, wherein to obtain a request to create the report data structure, the instructions when executed by the one or more processors further cause the one or more processors to:
   receive, from a user device, data indicative of a user selection of a graphical element provided for display in a graphical user interface, wherein the graphical element is associated with identifying information indicating that selection of the graphical element triggers generation of the report data structure.

3. The system of claim 1, wherein to map the extracted data to the multiple keyed data fields, the instructions when executed by the one or more processors further cause the one or more processors to:

execute one or more logical relationships between (i) at least one keyed data field of the first digital template and a field of the extracted data; and wherein to generate the report data structure based on (i) the mapped data and (ii) at least one or more instances of the static data that have been selectively activated based on the one or more reference identifiers, the instructions when executed by the one or more processors further cause the one or more processors to:

populate the keyed data fields of the first digital template using extracted data that maps to the keyed data fields using the one or more logical relationships.

4. The system of claim 1, wherein keyed data fields of the first digital template include the one or more reference identifiers.

5. A method for using an application programming interface to obtain data from one or more data sources for use in generating a report data structure using multiple template data structures to extract information from the one or more data sources, the method comprising obtaining a request to create the report data structure;

obtaining additional information related to the request, wherein the additional information includes data that identifies a drug or compound that is a candidate treatment for an ailment;

obtaining, based on the additional information, one or more reference identifiers, wherein the one or more reference identifiers identify one or more data sources storing clinical trial data related to the drug or compound;

generating, based on the one or more reference identifiers, a first digital template defining multiple keyed data fields that are configured to be dynamically populated using information extracted from the one or more data sources;

generating, based on the additional information that identifies the drug or compound that is the candidate treatment the ailment, a second digital template defining instances of static data, identified by the one or more reference identifiers, that are to be selectively activated based on whether or not the static data is relevant or related to the additional information;

extracting keyed data and natural language data from files in the one or more data sources;

mapping the extracted data to the multiple keyed data fields in the first digital template; and generating the report data structure based on (i) the mapped data and (ii) at least one or more instances of the static data that have been selectively activated based on the one or more reference identifiers.

6. The method of claim 5, wherein obtaining a request to create the report data structure comprises:

receiving, from a user device, data indicative of a user selection of a graphical element provided for display in a graphical user interface, wherein the graphical element is associated with identifying information indicating that selection of the graphical element triggers generation of the report data structure.

7. The method of claim 5, wherein mapping the extracted data to the multiple keyed data fields comprises:

executing one or more logical relationships between (i) at least one keyed data field of the first digital template and a field of the extracted data; and wherein generating the report data structure based on (i) the mapped data and (ii) at least one or more instances of the static data that have been selectively activated based on the one or more reference identifiers comprises:

populating the keyed data fields of the first digital template using extracted data that maps to the keyed data fields using the one or more logical relationships.

8. The method of claim 5, wherein keyed data fields of the first digital template include the one or more reference identifiers.

9. A non-transitory computer-readable medium storing software comprising instructions executable by one or more computers which, upon such execution, cause the one or more computers to:

obtain a request to create a report data structure;

obtain additional information related to the request, wherein the additional information includes data that identifies a drug or compound that is a candidate treatment for an ailment;

obtain, based on the additional information, one or more reference identifiers, wherein the one or more reference identifiers identify one or more data sources storing clinical trial data related to the drug or compound;

generate, based on the one or more reference identifiers, a first digital template defining multiple keyed data fields that are configured to be dynamically populated using information extracted from the one or more data sources;

generate, based on the additional information that identifies the drug or compound that is the candidate treatment the ailment, a second digital template defining instances of static data, identified by the one or more reference identifiers, that are to be selectively activated based on whether or not the static data is relevant or related to the additional information;

extract keyed data and natural language data from files in the one or more data sources;

map the extracted data to the multiple keyed data fields in the first digital template; and generate the report data structure based on (i) the mapped data and (ii) at least one or more instances of the static data that have been selectively activated based on the one or more reference identifiers.

10. The non-transitory computer-readable medium of claim 9, wherein to obtain a request to create the report data structure, the instructions upon execution further cause the one or more computers to:

receive, from a user device, data indicative of a user selection of a graphical element provided for display in a graphical user interface, wherein the graphical element is associated with identifying information indicating that selection of the graphical element triggers generation of the report data structure.

11. The non-transitory computer-readable medium of claim 9, wherein to map the extracted data to the multiple keyed data fields, the instructions upon execution further cause the one or more computers to:

execute one or more logical relationships between (i) at least one keyed data field of the first digital template and a field of the extracted data; and wherein to generate the report data structure based on (i) the mapped data and (ii) at least one or more instances of the static data that have been selectively activated based on the one or more reference identifiers, the instructions upon execution further cause the one or more computers to:

populate the keyed data fields of the first digital template using extracted data that maps to the keyed data fields using the one or more logical relationships.

* * * * *